3,236,833
METHOD OF EXTRACTING CARRAGEENAN IN THE PRESENCE OF HYDROGEN PEROXIDE
Arthur L. Gordon, Des Plaines, and John J. Jonas, Winnetka, Ill., assignors to National Dairy Products Corporation, New York, N.Y., a corporation of Delaware
No Drawing. Filed Feb. 19, 1964, Ser. No. 345,838
7 Claims. (Cl. 260—209)

This invention relates generally to the preparation of carrageenan, and more particularly relates to an improved method of manufacturing carrageenan having desirable properties.

Carrageenan is an anionic polysaccharide gum which has desirable hydrocolloidal properties. Carrageenan is employed as a viscosity increasing agent and as a stabilizing agent in various moisture containing products, e.g., chocolate milk, whipping compositions, salad dressings, ice cream and tooth paste. Carrageenan is also used in paints, inks and in various cosmetic and pharmaceutical products.

The viscosity increasing and suspending properties of carrageenan in chocolate milk are generally referred to as "milk reactivity." Milk reactivity is generally measured as the viscosity of a chocolate milk sample containing a particular amount of carrageenan, usually from about 0.01 to about 0.05 percent by weight of the chocolate milk.

Carrageenan is obtained by extraction from red algae seaweed, generally known as Irish moss or carrageen, and is conventionally marketed in the form of a dry powder. As used herein the term "carrageen" is intended to mean the Irish moss and the term "carrageenan" is intended to mean the polysaccharide gum extracted from the carrageenan. The carrageenan may either be a liquid solution or a dry powder.

In a usual process for manufacturing carrageenan, Irish moss is chopped and washed with water to remove impurities. The moss is slurried in water and the carrageenan is extracted from the moss under alkaline conditions and the moss slurry is filtered to separate the carrageenan solution from the insoluble constituents of the moss. Dried carrageenan is recovered from the carrageenan solution filtrate by roll drying or by alcohol precipitation.

However, a large percentage of the Irish moss raw material harvested for the manufacture of carrageenan is difficult to process and does not provide satisfactory yields of carrageenan under normal operating conditions. In this connection, it is often difficult to filter the moss slurry to separate the carrageenan solution from the insoluble constituents present in the moss slurry. Processes are known for increasing the yield of carrageenan that may be obtained from Irish moss. However, these processes are not altogether satisfactory in that they generally reduce the desired properties of the carrageenan particularly the milk reactivity of the carrageenan.

It is a principal object of the present invention to provide an improved method for the manufacture of carrageenan. Another object is to provide an improved method for the manufacture of carrageenan having desirable milk reactivity. A further object is to provide an improved method for the manufacture of carrageenan wherein the carrageenan solution is readily separated from the slurry of the Irish moss being treated. A still further object is to provide an improved method for the manufacture of carrageenan wherein carrageenan may be obtained from heretofore undesirable Irish moss raw materials without deleteriously affecting the milk reactivity of the carrageenan.

These and other objects of the invention will become apparent from a reading of the following detailed description.

Generally, the present invention is directed to an improved method of manufacturing carrageenan which comprises treating Irish moss with not more than about 11,000 parts per million (p.p.m.) of hydrogen peroxide, based on the dry weight of the Irish moss and extracting carrageenan therefrom. More specifically, in accordance with the described method, Irish moss is treated with from about 50 to about 3,000 p.p.m. of hydrogen peroxide and carrageenan is extracted therefrom under alkaline conditions.

In a conventional procedure for the manufacture of dried carrageenan, Irish moss is chopped, washed with fresh tap water at room temperature and an aqueous slurry of the Irish moss is prepared. The carrageenan is then extracted from the Irish moss in the presence of an alkaline material, e.g., calcium hydroxide, sodium hydroxide, potassium hydroxide or ammonium hydroxide, at an elevated temperature, e.g., 165° F. to 300° F. The carrageenan solution thus obtained is separated from the insoluble constituents present in the extracted moss slurry by filtering, after which dried carrageenan is recovered from the solution by roll drying or by alcohol precipitation. The dried carrageenan extract may be ground into a fine powder if desired.

It is believed, although the present invention is not considered to be limited thereto, that the difficulty that is encountered in filtering the extracted moss slurry to separate the carrageenan solution from the insolubles in the slurry, and the consequent low yields of carrageenan that are obtained, is due to the physical characteristics of the carrageenan solution. In this connection, it is thought that the molecular weight of the carrageenan and the size and shape of the carrageenan macromolecules are such that it is difficult to separate the carrageenan solution from the insolubles by filtration procedures.

It has been discovered that if the extraction of the carrageenan from the Irish moss is carried out in the presence of not more than 11,000 p.p.m. hydrogen peroxide, based on the dry weight of the Irish moss, the ability of the carrageenan solution to be filtered may be improved without deleteriously affecting the desirable properties, e.g., milk reactivity, of the carrageenan. The hydrogen peroxide is believed to cause depolymerization of the carrageenan which alters the molecular weight and/or size of the carrageenan macromolecules and decreases the viscosity of the carrageenan solution sufficiently to allow the carrageenan solution to be more readily filtered from the insolubles present in the extracted slurry. The depolymerization of the carrageenan by treatment with hydrogen peroxide reduces the viscosity and gel strength of an aqueous solution of the treated carrageenan. Surprisingly, the treatment of the carrageenan with hydrogen peroxide in accordance with the described method does not result in a commensurate decrease in the milk reactivity of the treated carrageenan. Although the exact reason for this phenomenon is not known, it is theorized that the kinetics of the reaction between hydrogen peroxide and that portion of the carrageenan which provides water viscosity is different from the kinetics of the reaction with that portion of the carrageenan which provides milk reactivity. If the carrageenan extraction is carried out in the presence of greater than 11,000 p.p.m. hydrogen peroxide, it has been found that the milk reactivity of the carrageenan is substantially reduced. However, in accordance with the present invention, when the carrageenan is extracted from Irish moss in the presence of less than 11,000 p.p.m. of hydrogen peroxide, a desirable decrease in the viscosity of the carrageenan is obtained without substantially reducing the milk reactivity of the carrageenan product.

The decrease in the viscosity of the carrageenan solution upon treatment of the Irish moss with hydrogen peroxide allows a greater amount of Irish moss raw materials to be extracted per extraction, utilizing the same amount of extraction liquid. This results in a greater throughput per extraction unit and a reduction in the operating costs per unit of carrageenan produced. Further, in many instances it is possible to obtain an increased yield of carrageenan per unit of Irish moss raw materials when the Irish moss is treated in accordance with the described invention. The particular amount of hydrogen peroxide added to the moss slurry is determined by balancing the desire for increased throughput and yield, which is obtained by increasing the amount of hydrogen peroxide, against the desire to retain the viscosity increasing properties, particularly milk reactivity, which are reduced as the amount of hydrogen peroxide added to the slurry is increased. Increased yields of carrageenan having desired milk reactivity are obtained when the alkaline extraction of the Irish moss is carried out in the presence of about 50 to about 3,000 p.p.m. hydrogen peroxide. Within this range, the use of from about 50 to about 2,000 p.p.m. of hydrogen peroxide is believed to be optimum.

The described method of obtaining increased yields of carrageenan by extracting the Irish moss in the presence of not more than about 11,000 p.p.m. of hydrogen peroxide may be carried out in the presence of any number of soluble alkaline materials, e.g., calcium hydroxide, sodium hydroxide, potassium hydroxide or ammonium hydroxide. However, the described method is particularly useful in the manufacture of carrageenan by a process which includes extraction of the carrageenan in the presence of calcium hydroxide, followed by filtration and roll drying of the carrageenan solution. Such a process provides carrageenan which has particularly desirable milk reactivity. Not all roll dried carrageenan has desirable milk reactivity and the extraction of the carrageenan in the presence of calcium hydroxide is believed to be preferable in the preparation of roll dried carrageenan having good milk reactivity.

The extraction of the carrageenan is generally carried out in the presence of from about ½ percent to about 5 percent of calcium hydroxide calculated as calcium oxide, preferably about 1 percent. It is understood that lime, i.e., calcium oxide, may be added to the slurry to form the calcium hydroxide.

The extraction of the carrageenan is carried out at an elevated temperature, e.g., 165° F. to 350° F., for a period from about ¼ hour to 3 hours, extraction period of longer than 3 hours usually being unnecessary. If desired the extraction may be carried out at pressures greater than ambient. Generally, as the extraction temperature is increased, the length of the extraction period is decreased.

The hydrogen peroxide may be added to the moss slurry in any convenient form. It is generally preferable to add the hydrogen peroxide to the moss slurry in the form of a dilute aqueous solution in order to distribute the hydrogen peroxide uniformly throughout the slurry, and to prevent undesirable localized degradation of the carrageenan which might occur if a concentrated hydrogen peroxide solution were added to the moss slurry. A dilute hydrogen peroxide solution may be prepared by diluting one volume of a standard 35 weight percent hydrogen peroxide solution with 9 volumes of water to provide a 3.5 percent solution. Alternately, other dilute hydrogen peroxide solutions may be employed, or, if desired, peroxide salts such as sodium peroxide, potassium peroxide, calcium peroxide and other solid peroxide compounds may be utilized to provide substantially the same result.

The dilute hydrogen peroxide solution may be added to the moss slurry prior to and/or during the extraction of the carrageenan from the moss. However, it has generally been found that improved results are obtained when a portion or all of the hydrogen peroxide is added to the moss slurry just prior to the beginning of the extraction period and the remainder, if any, of the dilute hydrogen peroxide is slowly added to the slurry during extraction of the carrageenan from the moss. In this connection, it is generally preferable to add the hydrogen peroxide to the moss slurry or the extraction liquid within a short time prior to beginning the extraction. If the hydrogen peroxide is added to the moss slurry or extraction liquid a relatively long period before extraction, the hydrogen peroxide becomes ineffective, probably due to the reaction with impurities present in either the moss or the extraction liquid. For general purposes it is desirable to add the hydrogen peroxide within a period of about 10 minutes before initiating the extraction.

It has been discovered that improved results, and improved control over the character of the extracted carrageenan solution, is generally obtained when the initial aliquot of hydrogen peroxide is added to the moss slurry or to the extraction liquid at a temperature below 180° F., preferably below 150° F. At higher temperatures the hydrogen peroxide becomes too reactive and localized degradation of the carrageenan may occur.

Specifically, in accordance with one process of the present invention about 25 percent to about 75 percent, usually about 50 percent, of the dilute hydrogen peroxide solution is added to the moss slurry just prior to or during the time the slurry is heated up to the extraction temperature. The remainder of the dilute hydrogen peroxide solution is slowly added to the slurry during the extraction period. The hydrogen peroxide added during the extraction period may be added over a period of from about 30 minutes to about 2 hours, generally over a period of about 1 hour. It is generally preferable to add an amount of a reducing agent, e.g., sodium sulfite, to the extracted slurry at the end of the extraction period to insure that all of the hydrogen peroxide added will be destroyed. The pH of the slurry is then adjusted to within the range of about 8.6 to 9.0 by the addition of a suitable basic compound, e.g., potassium carbonate.

Alternately, the moss slurry may be heated to the extraction temperature and all of the dilute hydrogen peroxide solution may be added thereto over a relatively short period of time, e.g., about 1 to 10 minutes. When all of the hydrogen peroxide is so added, care should be taken to prevent prolonged exposure of the moss slurry to excess hydrogen peroxide, and a reducing agent, such as sodium sulfite or sulfur dioxide, should be added to the moss slurry a short period of time, e.g., 5 minutes, after all of the hydrogen peroxide has been added to reduce excess hydrogen peroxide present in the slurry.

At the end of the extraction period the slurry is filtered to separate the carrageenan solution from the insolubles present in the moss. It is generally preferable to precoat the filter with a suitable filter aid. The filtration may be carried out at any suitable temperature and pressure in order to obtain maximum throughput and maximum yields. The carrageenan filtrate is then partially evaporated to remove a portion of the water and is roll dried. It has been found that it is desirable to roll dry the carrageenan filtrate as soon as possible after it has been filtered. In this connection, it has been determined that the prolonged exposure of the carrageenan filtrate to elevated temperatures adversely affects the properties of the carrageenan, particularly the milk reactivity thereof. Desirable carrageenan may be obtained when the carrageenan filtrate is roll dried within a period of not more than 1½ hours subsequent to filtering.

The following examples illustrate specific embodiments of the manufacture of carrageenan in accordance with the present invention.

EXAMPLE 1

3000 grams of Irish moss were chopped and washed with 10 gallons of tap water at 68° F. for 10 minutes after which the wash water was drained from the moss. The moss was then further washed on a shaking screen by spraying with water for one minute. The chopped and washed moss was placed in a cooking tank and slurried within 15 gallons of tap water. 36.5 grams of calcium hydroxide slurried in 200 milliliters of water were added to the moss slurry and the mixture was heated to 120° F. by means of steam injection. When the temperature of the alkaline moss slurry reached 120° F., 875 p.p.m. of hydrogen peroxide, based on the dry weight of moss, was added to the alkaline slurry over a period of 7 minutes, during which time the temperature of the slurry was raised to 205° F. This level of addition of hydrogen peroxide was effected by adding 75 milliliters of a 3.5 percent hydrogen peroxide solution, the temperature of the slurry was maintained at 205° F. for a period of 3 hours to extract the carrageenan from the moss. An additional 75 milliliters of the dilute hydrogen peroxide solution (875 p.p.m.) were slowly added to the slurry during the first hour of the extraction period. After the moss had been extracted for a period of 2 hours, the slurry had a pH of 8.7

40 pounds of the slurry were filtered in a four plate filter press at a temperature of 170° F. at 40 p.s.i.g. in a period of about 6½ minutes. Approximately 936 grams of a filter aid sold under the trade name "Tenn Flo 400F" was mixed with the slurry just prior to filtering. The carrageenan containing filtrate obtained from the filter press was roll dried and the dry carrageenan was ground into a fine powder. A yield of 35.7 percent carrageenan was obtained, calculated as percent solids in the filtrate based on the dry weight of Irish moss raw materials utilized.

EXAMPLE 2

Carrageenan was manufactured in accordance with Example 1 except that the total amount of hydrogen peroxide added to the moss slurry was 1165 p.p.m. based on the dry weight of moss, 582 p.p.m. being added to the moss slurry during heating of the slurry to 205° F. and 583 p.p.m. being slowly added to the slurry during the first hour of extraction at 205° F. In each instance the hydrogen peroxide was added in the form of a dilute aqueous solution as described in Example 1.

The extracted moss slurry was filtered at 40 p.s.i.g. and 170° F. for 7 minutes and a yield of 36.8 percent carrageenan was obtained.

EXAMPLE 3

Carrageenan was manufactured in accordance with Example 1 except that the total dry weight of moss extracted was 2,700 grams. The total amount of diluted hydrogen peroxide added was 1,750 p.p.m. based on the dry weight of moss, 800 p.p.m. of hydrogen peroxide was added during heating of the moss slurry at 205° F. and 950 p.p.m. of hydrogen peroxide was added during the first hour of the extraction period. The hydrogen peroxide was added in the form of a dilute, aqueous solution of the concentration set forth in Example 1.

The extracted slurry was filtered at 40 p.s.i.g. and 180° F. for a period of 3 minutes and a yield of 38.3 percent carrageenan was obtained.

EXAMPLE 4

2,700 grams of Irish moss were chopped, washed and slurried with calcium hydroxide in accordance with Example 1. The moss slurry was then heated to 205° F. with steam injection and after holding for 10 minutes at 205° F. 2,595 p.p.m. of hydrogen peroxide, based on the dry weight of moss, were added to the slurry over a period of 5 minutes. The hydrogen peroxide was added in the form of a dilute, aqueous solution of the concentration set forth in Example 1. The slurry was then stirred for 5 minutes while maintaining the temperature at 205° F. and 16 grams of sodium sulfite reducing agent dissolved in 200 milliliters of water were added to the slurry to reduce any excess peroxide present therein. The moss slurry was then extracted for an additional period of 2 hours at 205° F., after which the slurry had a pH of 8.7. 40 pounds of the slurry were then filtered in accordance with Example 1 at a pressure of 40 p.s.i.g. at 180° F. for a period of 2 minutes. The carrageenan solution was roll dried and a yield of 39.5 percent carrageenan was obtained.

EXAMPLE 5

Carrageenan was manufactured in accordance with Example 4 except that the slurry was filtered at 40 p.s.i.g. and at a temperature of 165° F. to 170° F. for a period of 4 minutes. A yield of 39.7 percent carrageenan was obtained.

The viscosity increasing properties of samples of each of the powdered carrageenans prepared in accordance with the foregoing examples were compared against the viscosity increasing properties of a control carrageenan extract manufactured in accordance with Example 1 except that the extraction was carried out in the absence of hydrogen peroxide. The control sample had a yield of 33.7 percent, calculated as percent solids in the filtrate based on the dry weight of the moss.

The milk reactivity of the carrageenan was determined by measuring the viscosity of 500 grams of a standard cholcolate milk containing 130 milligrams of carrageenan. The viscosity of the carrageenan containing cholcolate milk was measured in a viscosity flow cup at a temperature of 50° F.

The gel strength of the carrageenan was measured by preparing a 2 percent aqueous solution of the extract. The gel strength was measured with a submerged disc gel cuter at 50° F. The viscosity of the carrageenan was determined using a 1% aqueous solution in a Brookfield viscometer at 98° F. These properties are compared in Table I.

*Table I*

| Example | Hydrogen Peroxide Treatment, p.p.m. Dry Moss | Milk Reactivity, Seconds | Gel Strength of 2% Aqueous Solution, gms./cm.$^2$ | Viscosity of 1% Aqueous Solution, Seconds | Yield, Percent |
|---|---|---|---|---|---|
| Control | 0 | 42.5 | 80 | 540 | 33.7 |
| 1 | 1,750 | 40.5 | 93 | 345 | 35.7 |
| 2 | 1,165 | 43.4 | 101 | 415 | 36.8 |
| 3 | 1,750 | 40.1 | 84 | 290 | 38.3 |
| 4 | 2,595 | 37.0 | 74 | 185 | 39.5 |
| 5 | 2,595 | 34.0 | | | 39.7 |

Additional extractions of carrageenan from Irish moss were carried out in accordance with the invention and the results are shown in Table II. The carrageenan of each of Examples 6 through 14 was prepared from 375 pounds of Irish moss which was washed on a shaker screen and slurried with 250 pounds of filter aid and 5 pounds of hydrated lime in approximately 1200 gallons of water. The slurry was heated to 130° F. and the various amounts of hydrogen peroxide were added to the slurry in the form of a 3.5 percent solution. The temperature of the slurry was raised to 205° F. over a period of 35 minutes and the moss was extracted at 205° F. for 2 hours. One pound of sodium sulfite was added to the slurry during the last 10 minutes of the extraction to reduce any remaining hydrogen peroxide. The pH of the slurry was adjusted to 8.6 to 8.9 by the addition of potassium carbonate. The slurry was then filtered at 225° F. to 250° F. and at a pressure of 40 to 60 p.s.i.g. The resulting carrageenan filtrate was partially evaporated in an evaporator and was roll dried within a period of about 1 hour after being filtered.

The properties of the various carrageenan samples were measured. The milk reactivity and the viscosity of a 1 percent aqueous solution were measured using a viscosity flow cup, and the gel strength is measured in accordance with Example 1. The viscosity flow cup was similar to a Zahn viscosimeter, manufactured by General Electric Company, although other viscosity-measurement means may also be used. The carrageenan samples were employed as stabilizing agents in ice cream. In this connection, the various carrageenan samples were mixed at a level of 0.015 percent with a conventional ice cream mix and the syneresis or wheying off of the ice cream mixture was measured. The ice cream was considered to have a positive syneresis if a sample of the ice cream mix placed in a 250 ml. beaker and held at 45° F. for 12 hours did not have more than $\frac{1}{16}$ inch of liquid separated from the mix.

The examples of Table II were compared against controls prepared from the same batch of Irish moss without being treated with hydrogen peroxide.

*Table II*

| Example | Hydrogen Peroxide Treatment, p.p.m. Dry Moss | Milk Reactivity, Seconds | Gel Strength of 2% Aqueous Solution, gms./cm$^2$ | Viscosity of 1% Aqueous Solution, Seconds | Ice Cream Syneresis at 0.015% level |
|---|---|---|---|---|---|
| Control | | 35.2 | 84 | 175 | Positive. |
| 6 | 4,880 | 34.8 | 60 | 55 | Do. |
| 7 | 3,490 | 35.9 | 57 | 65 | Negative. |
| 8 | 2,790 | 36.2 | 58 | 75 | Do. |
| Control | | 38.0 | 149 | 145 | Positive. |
| 9 | 2,790 | 33.6 | 80 | 75 | Negative. |
| 10 | 2,090 | 36.7 | 76 | 100 | Positive. |
| 11 | 2,090 | 36.8 | 86 | 100 | Do. |
| 12 | 2,090 | 39.0 | 98 | 110 | Do. |
| 13 | 2,090 | 37.3 | 99 | 120 | Do. |
| 14 | 2,090 | 39.5 | 80 | 100 | Do. |

It will be seen that a definite relationship exists between the amount of hydrogen peroxide added to the moss slurry during the extraction of the carrageenan, the properties of the carrageenan and the yield of the carrageenan. As the parts per million of hydrogen peroxide added to the moss slurry are increased, the viscosity of a 1 percent aqueous solution, of the carrageenan extract is decreased. However, if the hydrogen peroxide treatment is carried out in accordance with the present invention the milk reactivity is not substantially decreased and may be increased. At the same time, it may be possible to obtain increased yields.

It can be seen that a method of manufacturing a carrageenan extract has been disclosed which provides for increased yields of carrageenan extract. When the amount of hydrogen peroxide added to the moss slurry is kept below the indicated amount, increased yields of the carrageenan extract may be obtained without substantially affecting the milk reactivity of the carrageenan.

Various of the features of the present invention are set forth in the following claims.

What is claimed is:

1. A method of manufacturing carrageenan which comprises extracting carrageenan from Irish moss by preparing an aqueous slurry of Irish moss, treating the slurry with not more than about 11,000 p.p.m. of hydrogen peroxide, and separating the aqueous carrageenan containing solution from the moss insolubles.

2. A method of manufacturing carrageenan which comprises, extracting carrageenan from Irish moss by preparing an aqueous slurry of Irish moss, treating the slurry with about 50 to about 11,000 p.p.m. of hydrogen peroxide, and separating the aqueous carrageenan containing solution from the moss insolubles.

3. A method of manufacturing carrageenan which comprises, preparing an aqueous alkaline slurry of Irish moss, treating the slurry with about 50 to about 11,000 p.p.m. of hydrogen peroxide, extracting carrageenan from the Irish moss in the presence of an alkaline material selected from calcium hydroxide, sodium hydroxide, potassium hydroxide or ammonium hydroxide, and separating the aqueous carrageenan containing solution from the moss insolubles.

4. A method of manufacturing carrageenan which comprises, forming an aqueous alkaline slurry of Irish moss and from about ½ percent to about 5 percent of an alkaline material selected from calcium hydroxide, sodium hydroxide, potassium hydroxide or ammonium hydroxide, treating the alkaline slurry with about 50 to about 11,000 p.p.m. of hydrogen peroxide, extracting carrageenan from the Irish moss at a temperature between about 165° F. to about 350° F., treating the slurry with a reducing agent to decompose excess hydrogen peroxide, and separating the carrageenan containing aqueous solution from the moss insolubles.

5. A method of manufacturing carrageenan which comprises, forming an aqueous alkaline slurry of Irish moss and from about ½ percent to about 5 percent of an alkaline material selected from the group consisting of calcium hydroxide, sodium hydroxide, potassium hydroxide and ammonium hydroxide, treating the alkaline slurry with between about 50 and about 3,000 p.p.m. of hydrogen peroxide, extracting carrageenan from the Irish moss at a temperature between about 185° F. to about 225° F., from about 25 percent to about 75 percent of the hydrogen peroxide being added to the slurry during heating of the slurry to the extraction temperature, the remainder of the hydrogen peroxide being slowly added to the slurry during the extraction, treating the slurry at the end of the extraction with sodium sulfite to decompose residual hydrogen peroxide, and separating the carrageenan containing solution from the moss insolubles.

6. A method of manufacturing carrageenan which comprises, forming an aqueous alkaline slurry of Irish moss and about 1 percent calcium hydroxide, treating the alkaline slurry with about 50 to about 2,000 p.p.m. of hydrogen peroxide, extracting carrageenan from the Irish moss at a temperature between about 185° F. to about 225° F. for a period of from about ¾ hour to about 3 hours, from about 25 percent to about 75 percent of the hydrogen peroxide being added to the slurry during heating of the slurry to the extraction temperature, the remainder of the hydrogen peroxide being slowly added to the slurry during the extraction over a period of about ½ hour to about 2 hours, treating the slurry at the end of the extraction with sodium sulfite to decompose excess hydrogen peroxide, filtering the slurry to separate the carrageenan containing aqueous solution from the moss insolubles present in the slurry, and roll drying the carrageenan containing aqueous solution within a period of not more than 1½ hours after completing the filtration.

7. A carrageenan product manufactured in accordance with the process of claim 1.

References Cited by the Examiner
UNITED STATES PATENTS

| | | | |
|---|---|---|---|
| 2,076,889 | 4/1937 | Hees | 260—209 |
| 2,767,167 | 10/1956 | Opie | 260—209 |
| 3,094,517 | 6/1963 | Stanley | 260—209 |

LEWIS GOTTS, *Primary Examiner.*